(12) United States Patent
Williamson et al.

(10) Patent No.: US 10,506,483 B1
(45) Date of Patent: Dec. 10, 2019

(54) SATELLITE SYSTEM WITH HANDOVER MANAGEMENT

(71) Applicant: Blue Digs LLC, Wilmington, DE (US)

(72) Inventors: Keith Williamson, Los Angeles, CA (US); James Scott, Manhattan Beach, CA (US)

(*) Notice: Subject to any disclaimer, the term of this patent is extended or adjusted under 35 U.S.C. 154(b) by 4 days.

(21) Appl. No.: 15/672,199

(22) Filed: Aug. 8, 2017

Related U.S. Application Data

(60) Provisional application No. 62/523,029, filed on Jun. 21, 2017.

(51) Int. Cl.
*H04W 36/12* (2009.01)
*H04B 7/185* (2006.01)
*H04B 7/195* (2006.01)

(52) U.S. Cl.
CPC ........ *H04W 36/12* (2013.01); *H04B 7/18521* (2013.01); *H04B 7/18584* (2013.01); *H04B 7/195* (2013.01)

(58) Field of Classification Search
CPC ............ H04B 7/18539; H04B 7/18563; H04B 17/309; H04B 17/318; H04B 7/195; H04B 7/18521; H04B 7/18584; H04W 36/00; H04W 36/08; H04W 36/12; H04W 36/32
See application file for complete search history.

(56) References Cited

U.S. PATENT DOCUMENTS

| | | | | |
|---|---|---|---|---|
| 6,353,412 B1* | 3/2002 | Soliman | ................ | G01S 5/0054 342/387 |
| 6,463,279 B1* | 10/2002 | Sherman | ............ | H04B 7/18539 455/12.1 |
| 6,477,373 B1* | 11/2002 | Rappaport | ........ | H04W 36/0079 455/436 |
| 6,571,102 B1* | 5/2003 | Hogberg | ............ | H04B 7/18563 370/329 |
| 2010/0323704 A1* | 12/2010 | Tailor | .................... | H04W 36/32 455/438 |
| 2011/0255513 A1* | 10/2011 | Karaoguz | ............. | H04M 1/725 370/331 |
| 2016/0183145 A1* | 6/2016 | Chintada | ............ | H04B 7/18578 370/331 |
| 2016/0210209 A1* | 7/2016 | Verkaik | ............... | G06F 11/2033 |
| 2016/0323032 A1* | 11/2016 | Ulupinar | ............ | H04B 7/18541 |
| 2017/0238216 A1* | 8/2017 | Damnjanovic | ...... | H04B 17/309 455/427 |
| 2017/0289822 A1* | 10/2017 | Hreha | .................... | H04W 16/28 |

* cited by examiner

*Primary Examiner* — Benjamin H Elliott, IV
*Assistant Examiner* — Prince A Mensah

(57) ABSTRACT

A satellite system may have a constellation of communications satellites that provides services to users with user devices such as portable electronic devices and home and office equipment. The constellation of satellites may include low-earth orbit satellites or other non-geostationary satellites having coverage areas that move across the surface of the Earth as the satellites orbit the Earth. The system may have gateways that communicate with the user devices as satellites move into and out of range. Computing equipment at a gateway or associated metropolitan point of presence may direct the gateways to handover communications sessions with the user devices from an outgoing satellite to an incoming satellite. Handover operations may involve handovers in prioritized batches, make-before-break handover procedures, and break-before-make handover procedures.

17 Claims, 8 Drawing Sheets

SATELLITE SYSTEM WITH HANDOVER MANAGEMENT

This application claims the benefit of provisional patent application No. 62/523,029, filed on Jun. 21, 2017, which is hereby incorporated by reference herein in its entirety.

FIELD

This disclosure relates generally to satellite communications, including to handover management in a satellite system with moving cells.

BACKGROUND

Communications systems often use satellites to convey data. Satellite-based systems allow information to be conveyed wirelessly over large distances, such as oceans and continents. For example, satellite-based systems can be used to convey media information to a large number of receivers over a large area, such as broadcast satellite networks. Further, satellite communications systems can be used to provide coverage where physical infrastructure has not been installed and/or to mobile devices that do not remain attached to an infrastructure resource. For example, satellite communications systems can provide communications capabilities to land-based devices such as handheld equipment and home or office equipment.

It can, however, be challenging to implement an effective satellite-based communications system. For example, operations associated with managing user sessions in a satellite communication system can be overly complex or satellite communications can be disrupted if contact with a satellite is lost.

SUMMARY

A satellite system may have a constellation of communications satellites. Gateways may provide provides services to users with user devices such as portable electronic devices and home and office equipment through the constellation of satellites.

The constellation of satellites may include non-geostationary satellites having coverage areas that move across the surface of the Earth as the satellites orbit the Earth. The system may have computing equipment with a distributed resource manager that controls the gateways. The resource manager and gateways may be used in performing handover operations that allow the gateways to communicate with the user devices as satellites move into and out of range.

During operation, the computing equipment may direct the gateways to hand over communications sessions with the user devices from an outgoing satellite to an incoming satellite. Handover operations may involve handovers in prioritized batches, make-before-break handover procedures, and break-before-make handover procedures.

Because the satellite communications system includes both moving terrestrial devices (UEs) and moving satellites (and thus moving cells), the total volume of handovers can significantly exceed those of a conventional terrestrial system. The handovers (mobility management) in the satellite communications system can be managed centrally, e.g., by a system-level or regional level management node. Mobility management can include managing the registration, connectivity, and attachment state for all electronic devices (e.g., UEs) in the system or region. In some aspects, handover events associated with a particular time period (e.g., for the system or a particular region) can be batched into one or more sets and all of the handovers associated with a set can be executed substantially simultaneously, e.g., in a bulk handover event. In some implementations, the batching can be performed in accordance with the respective priority of electronic devices and/or the traffic associated with them. Further, in some implementations, the satellite communications system may be configured to perform the handover without assistance from the electronic device being handed-over. The handovers can be performed using various handover procedures.

For some types of service, the satellite communications system can employ techniques to reduce or minimize disruptions in data delivery (e.g., Quality of Service) associated with a handover event. A make-before-break handover technique can be used, in which an electronic device makes a connection with a new serving satellite (an incoming satellite) before breaking an existing connection with the currently serving satellite (an outgoing satellite). The electronic device will point a second antenna or second antenna beam at the incoming satellite, so that data transmitted to the electronic device is substantially simultaneously received from both the incoming and outgoing satellites, effectively resulting in duplicate data streams. The electronic device also can have sufficient processing capabilities to demodulate, decode, and/or otherwise process the additional received data, e.g., in real-time or near real-time. The electronic device can then adjust for timing differences between the two reception paths (e.g., time alignment), eliminate duplicate data (e.g., from a receive buffer based on comparison of sequence numbers, timestamps, etc.), and combine or otherwise use the received data to continue to provide a communications function, such as media streaming. This technique is particularly advantageous where data delivery latency exceeds the duration of a single frame of data.

For some other types of service and/or electronic device (e.g., a device that cannot simultaneously point antennas or antenna beams at two different satellites), a break-before-make handover process can be employed. The break-before-make procedure also makes more efficient use of satellite communications system resources, since the same data is not transmitted from two separate satellites. A time-division multiplexed (TDM) frame structure can be used that includes fixed duration frames having multiple time slots per frame. During a handover, bandwidth within a TDM frame can be assigned to the electronic device in a manner that accounts for (i) the time required for the electronic device to repoint its antenna/antenna beam at a different satellite and (ii) the path delay differential between the current satellite (outgoing) and the next satellite (incoming), so that a subsequent transmission (N+1) will not arrive at the electronic device before it has completed reception of the current transmission (N) and repointed its antenna/antenna beam at the next satellite. Accordingly, a connection with an outgoing satellite can be broken before a connection with an incoming satellite is made, while ensuring that no data loss occurs as a result of transmission timing between the different satellites.

DETAILED DESCRIPTION

The present disclosure, including the accompanying drawings, is illustrated by way of examples and not by way of limitation.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and/or other equipment. The wireless services can include any of voice, data, and/or broadcast services, among other services. For example, wireless services can be provided to handheld devices, wearable devices, set-top boxes, media devices, mobile terminals, computing devices, sensors, etc.

Figure 1:
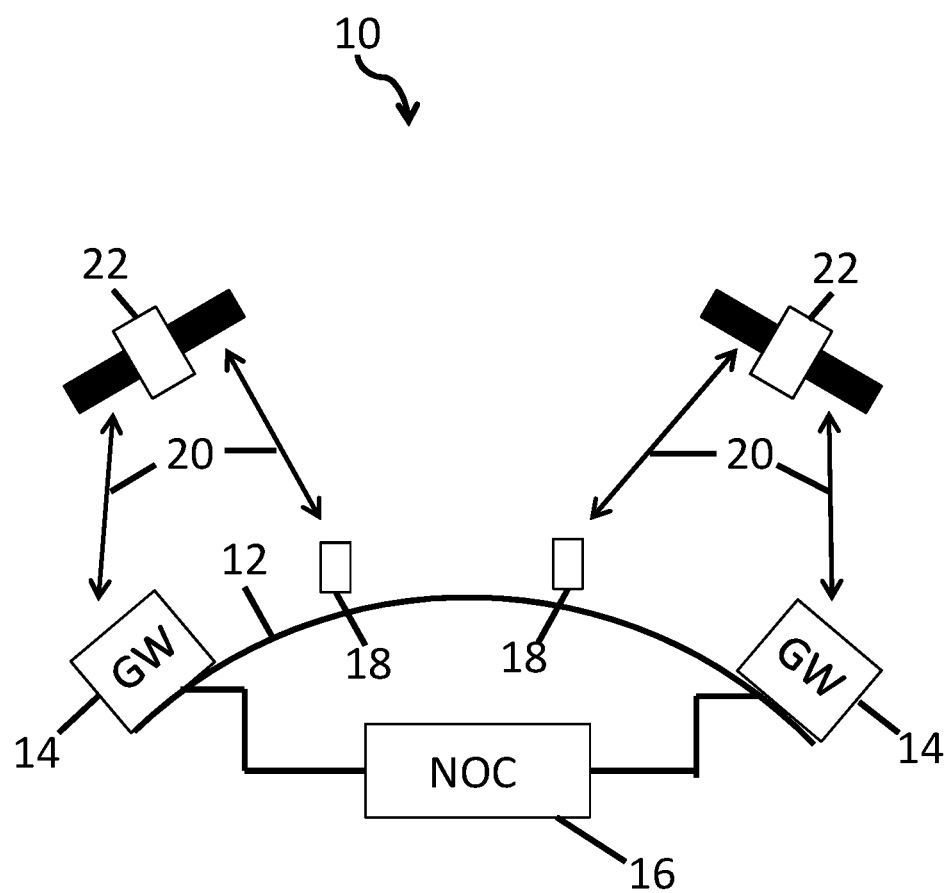
FIG. 1 presents a schematic diagram of an example of a communications system including satellites, in accordance with some embodiments.

An illustrative communications system with satellites is shown in FIG. 1. As shown in FIG. 1, communications system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of communications system 10 (e.g., 10-100, 1,000-10,000, more than 100, more than 1000, fewer than 10,000, etc.). If desired, system 10 may include high-altitude platforms (HAPs) such as unmanned aircraft, airships, or balloons in addition to or instead of space platforms such as satellites 22. Configurations in which system 10 is based on platforms such as satellites 22 are sometimes described herein as examples. This is merely illustrative. In general, communications system 10 may include any suitable mobile platforms (satellites, HAPs, etc.) for supplying wireless services to users.

Satellites 22 may deliver wireless services to equipment such as electronic devices 18 (sometimes referred to as user equipment, user terminals, or user devices). Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals (e.g., gateways), and other electronic equipment. Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14 (sometimes referred to as ground stations). If desired, network operations can be managed using equipment at gateways 14, using equipment distributed throughout system 10, using multiple network operation centers 16 and/or other suitable equipment (e.g., servers or other control circuitry). The use of a network operations center such as NOC 16 of FIG. 1 is merely illustrative. In some configurations, clusters of gateways 14 and/or other equipment may share resources (e.g., gateways 14 in a metropolitan area may share a bank of modems located at one of the gateways 14 or other locations).

There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of communications system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. A satellite terminal, e.g., an electronic device 18, that includes an external portion can be configured to receive signals in any of one or more frequency bands and to relay the received signals to a corresponding indoor portion. Further, the outdoor portion of a satellite terminal, e.g., an electronic device 18, can be configured to transmit signals in any of one or more frequency bands, including converting between frequencies for reception and/or transmission. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

Figure 2:
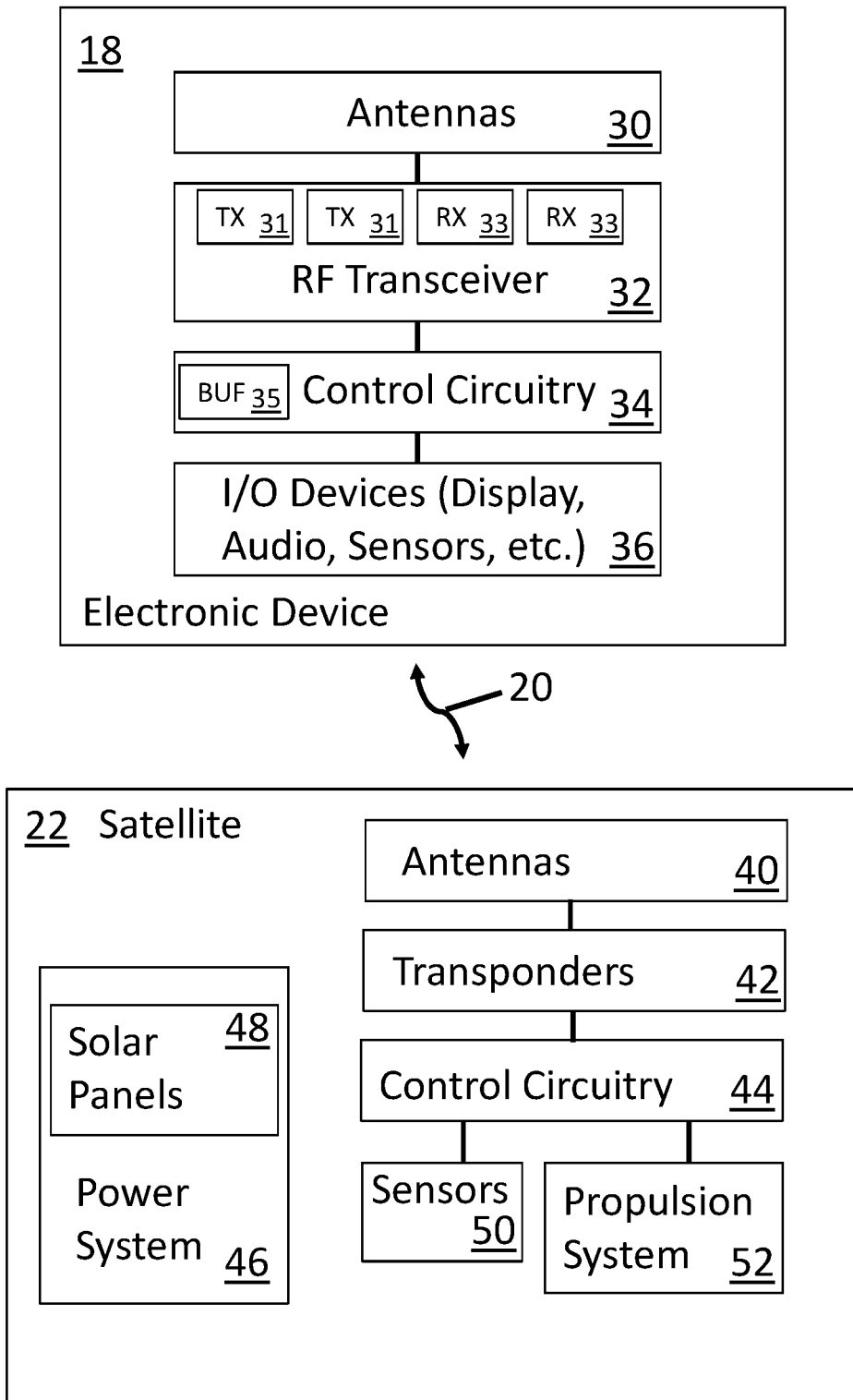
FIG. 2 presents a schematic diagram showing an example of an electronic device in communication with a communications satellite, in accordance with some embodiments.

FIG. 2 presents a schematic diagram of an illustrative electronic device 18 in communication, over a wireless communications link 20, with an illustrative satellite 22. As shown in FIG. 2, electronic device 18 may include one or more antennas 30. Antennas 30 may include any/all of monopoles, dipoles, and/or other types of antenna elements. Antennas 30 may, for example, include any/all of loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. The antennas 30 can be implemented such that they are suitable for communication with one or more satellites using one or more satellite communications bands. For example, one antenna (or one phased antenna array) may communicate with one satellite 22, while another antenna (or phased antenna array) may communicate with another satellite. Radio-frequency transceiver circuitry 32 may include radio-frequency receiver circuitry and/or radio-frequency transmitter circuitry that allows electronic device 18 to transmit and/or receive wireless signals over wireless communications link 20 using one or more antennas 30. In some configurations, transceiver 32 may include multiple transmitters 31 and multiple receivers 33. In these configurations, device 18 may handle communications over multiple channels simultaneously (e.g., to communicate with a first satellite over a first channel using a first receiver and transmitter (or transceiver) while communicating with a second satellite over a second channel using a second receiver and transmitter (or transceiver)).

Electronic device 18 may also include control circuitry 34 and input-output devices 36. Control circuitry 34 may include storage, such as solid-state drives, random-access memory, and/or hard disk drives and other volatile and/or nonvolatile memory. One or more buffers such as buffer 35 may be implemented in the memory of control circuitry 34. Buffer 35 may, for example, buffer data associated with satellite communications to avoid disruption (e.g., momentary loss of service) when switching between satellites, e.g., as satellites and/or devices 18 move during operation of communications system 10. Control circuitry 34 may include one or more microcontrollers, microprocessors, digital signal processors, communications circuits with processors, application specific integrated circuits, programmable logic devices, field programmable gate arrays, and/or other processing circuitry. During operation, control circuitry 34 may run (or execute) code (instructions) that is stored in the storage of control circuitry 34 to implement desired functions for electronic device 18.

Control circuitry 34 may use input-output devices 36 to supply output to an interface configured to render output perceivable by a user and/or to external equipment, and may gather input received from a user and/or external source(s). Input-output devices 36 may include any/all of displays configured to present images, audio devices (e.g., speakers and/or microphones), sensors, controls, haptic actuators, and other components. For example, input-output devices 36 may include user input devices, such as one or more buttons, touch screens, sensors (e.g., accelerometers and/or gyroscopes), microphones for gathering voice commands, and/or other components for gathering input from a user. Further, input-output devices 36 may include speakers, light-emitting components, displays, vibrators and/or other haptic output devices, and other equipment for supplying a user with output. Input-output devices 36 may include sensors such as force sensors, position sensors, gyroscopes, magnetic sensors, accelerometers, capacitive touch sensors, proximity sensors, ambient light sensors, temperature sensors, moisture sensors, gas sensors, pressure sensors, and other sensors for gathering information representative of the environment in which electronic device 18 is located.

A satellite, such as satellite 22, may include one or more antennas 40. Antennas 40 may be based on any suitable type(s) of antenna elements (e.g., antenna elements such as any/all of monopoles or dipoles, loop antennas, helical antennas, patch antennas, inverted-F antennas, Yagi antennas, slot antennas, horn antennas, cavity antennas, etc.). Antennas 40 may be used in any suitable type(s) of antenna arrays (e.g., phased antenna arrays, fixed direct radiating arrays, deployable direct radiating antenna arrays, space fed arrays, reflector fed arrays, etc.). The antennas 40 can be implemented such that they are suitable for communication with one or more electronic devices 18, gateways 14, other satellites 22, or other communication devices/nodes using one or more satellite communications bands.

Satellite 22 may include transceiver circuitry that is communicatively coupled (directly or indirectly) to antennas 40. The transceiver circuitry may include one or more components, such as one or more transponders 42 for receiving uplink signals and transmitting downlink signals, e.g., over links 20. Further, control circuitry 44 may be used to control the operation of satellite 22. Control circuitry 44 may include storage and/or processing circuits, e.g., of the type used in control circuitry 34.

Power may be supplied to satellite 22 from power system 46. Power system 46 may include one or more solar panels 48 (or arrays of solar panels) for converting energy from the sun into electrical power. Power system 46 may include power regulator circuitry and batteries for storing electrical power generated by solar panels 48, and for distributing power to the components of satellite 22. Control circuitry 44 may receive information from one or more sensors 50. Further, control circuitry 44 may receive commands from NOC 16 and, using information from one or more sensors and/or received commands, may perform maintenance and/or control operations (e.g., software updates, operations related to the deployment and operation of solar panels 48, diagnostic routines, altitude adjustments and other orbital adjustments using propulsion system 52, etc.). Sensors 50 may include light-based sensors (e.g., infrared cameras, visible light cameras, etc.), lidar, radar, sensors that measure backscattered light and/or backscattered radio-frequency signals, temperature sensors, radiation sensors, accelerometers, gyroscopes, magnetic sensors, spectrometers, and/or other sensors. Sensors 50 may be used in performing remote sensing operations, fault detection, satellite positioning, and other operations.

Figure 3:
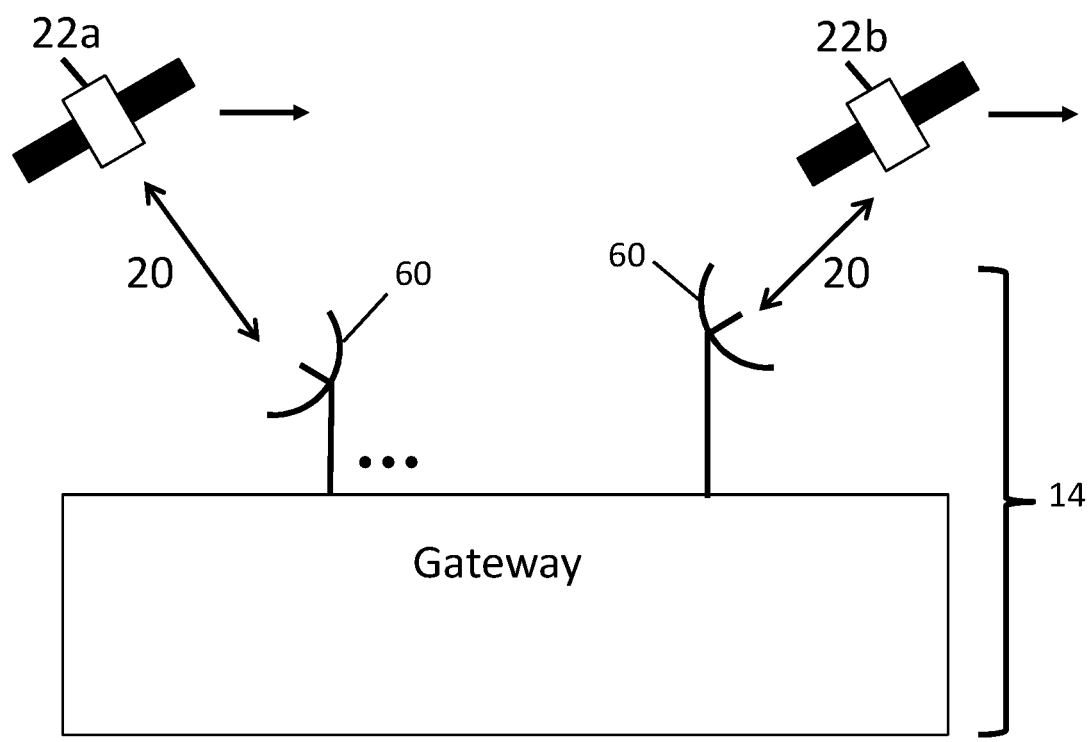
FIG. 3 presents a schematic diagram showing an example of a gateway, in accordance with some embodiments.

FIG. 3 is a diagram of an illustrative gateway (ground station) for communications system 10. As shown in FIG. 3, gateway 14 may include one or more satellite antennas such as antennas 60. Antennas 60 may receive signals from satellites 22 (e.g., satellites 22a and 22b) over links 20. By using multiple antennas 60, gateway 14 may, if desired, establish a communications link 20 with an incoming satellite 22a (a satellite entering the field of view) as a currently active satellite 22b moves out of range. Gateway 14 may include satellite transceiver circuitry (e.g., satellite signal transmitters and receivers) coupled to antennas 60. The transceiver circuitry may be used in transmitting information to and/or receiving information from satellites 22 (e.g., satellites 22a and 22b).

In some configurations, gateways, such as gateway 14, may be linked with a metropolitan point of presence that has a pool of modems for handling user communications sessions (e.g., voice, data, streaming media, etc.). This type of arrangement is shown in FIG. 4.

Figure 4:
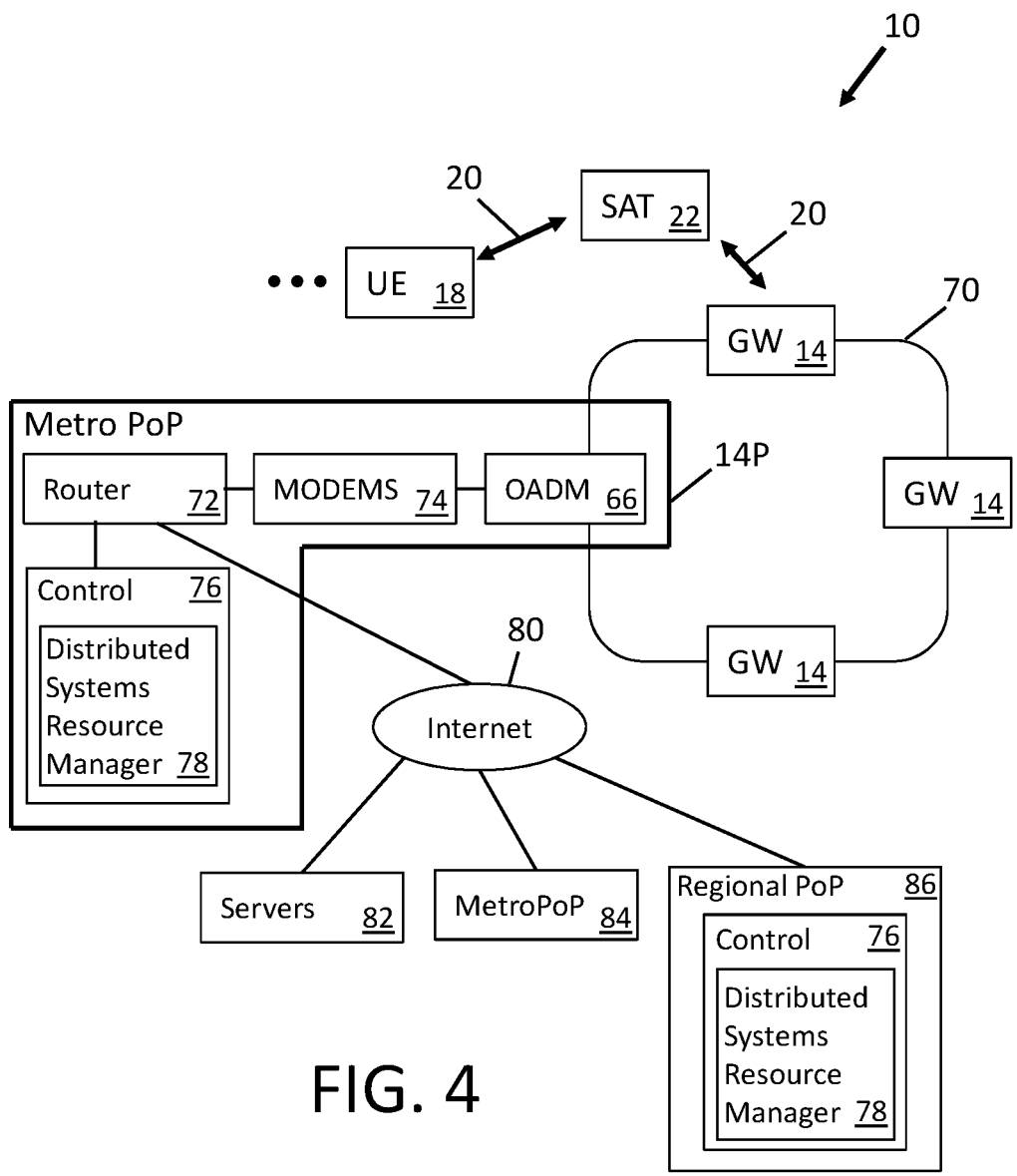
FIG. 4 presents a schematic diagram of an example satellite system with interconnected gateways, in accordance with some embodiments.

As shown in FIG. 4, communications paths such as optical fibers 70 may carry traffic for multiple gateways 14, each of which may have antennas 60 and other resources of the type shown in FIG. 3 for communicating with satellites 22 (e.g., low earth orbit satellites and/or other satellites) over links 20. There may be any suitable number of gateways 14 in a metropolitan area (e.g., 3-10, at least 2, at least 4, at least 6, fewer than 20, etc.) and each of these gateways 14 may be coupled to fiber 70 using a respective optical add-drop multiplexer.

Each metropolitan area in system 10 may include one or more metropolitan points of presence such as metropolitan point of presence 14P. Point of presence 14P may contain circuitry such as modems 74 for demodulating incoming signals from fiber 70 into digital data (e.g., digital data packets such as internet protocol packets carried by the signal paths in metropolitan point of presence 14P and networks to which metropolitan point of presence 14P is linked). Modems 74 may include radio access network cellular base station modems and/or digital video broadcast modems. During data reception operations, demodulated digital data from modems 74 may be supplied to router 72, which may distribute the data digitally. During data transmission operations, digital data from router 72 may be modulated using modems 74 and transmitted over fiber 70 using optical add-drop multiplexer 66.

Router 72 may supply digital data to control circuitry 76 (e.g., one or more servers). Control circuitry 76 may be configured to implement a distributed system resource manager 78. Resource manager 78 may be used in controlling the operation of metropolitan point of presence 14P and associated equipment in system 10. For example, resource manager 78 may manage link resources (e.g., capacity and carriers).

Router 72 may also couple metropolitan point of presence 14P to network 80 (e.g., the internet and/or other networks). Through network 80, users at equipment 18 may be provided with access to content such as content on servers 82. Content from servers 82 may, for example, be routed to modems 74 using router 72. This content may include web content retrieved by equipment 18, streaming multimedia content, broadcast content, and/or other content for equipment 18.

If desired, router 72 may be coupled to other metropolitan points of presence 84 using network 80. Network 80 may also be used in coupling metropolitan point of presence 14P to a regional point of presence such as regional point of presence 86 (which may be coupled to multiple metropolitan points of presence). Regional point of presence 86 may, if desired, receive network traffic from a network formed from interlinked regional points of presence (e.g., a national or global network of regional points of presence). Points of presence 84 and 86 may include servers or other control circuitry 76 on which distributed systems resource manager(s) 78 may be implemented.

Modems 74 of FIG. 4 may include scalable modem resources (e.g., modems configured using a scalable cloud-based radio-access network base station architecture). Using this type of arrangement, modems 74 may be able to terminate numerous sessions (e.g., sessions associated with numerous users at numerous respective electronic devices 18). Modems 74 of FIG. 4 may, for example, be used in handling at least 100,000 simultaneous sessions, at least 500,000 simultaneous sessions, at least 1 million simultaneous sessions, at least 3 million simultaneous sessions, fewer than 20 million simultaneous sessions, etc. The traffic aggregated at metropolitan point of presence 14P may exceed 0.1 terabits per second, may exceed 1 terabits per second, or may be less than 100 terabits per second.

In the illustrative configuration of FIG. 4, modems 74 are centralized at one or more metropolitan (and/or regional) points of presence and need not be present at gateways 14 (e.g., in some implementations, gateways 14 may be free of modems). Centralizing modems 74 at metropolitan point of presence 14P in this way allows modems 74 to be efficiently scaled (e.g., modem resources in system 10 may form a shared pool of resources that handles terabit-scale traffic associated with multiple gateways 14). If desired, gateways 14 may contain modems in some configurations.

Distributed systems resource manager 78 (sometimes referred to as a resource manager or manager) may be implemented using the resources of FIG. 4 such as control circuitry (computing equipment) 76 at points of presence and/or using control circuitry (computing equipment) at other locations (e.g., gateways 14, satellites 22, and/or user equipment 18). Configurations in which resource manager 78 operates on computing equipment associated with metropolitan and regional points of presence such as points of presence 14P, 84, and 86 may sometimes be described herein as an example.

Satellites 22 provide satellite coverage areas that move across the surface of the Earth as satellites 22 orbit the Earth. Using beam forming techniques, each satellite 22 can support traffic in multiple cells. User devices 18 and satellites 22 can move with respect to the Earth and with respect to each other. Communications sessions can be handed over as a user devices transitions between different satellite cells. Handover operations can be managed using the resources of system 10 such as resource manager 78 (e.g., in a network-driven configuration).

During operation, resource manager 78 may manage registration, connectivity, and attachment state for some or all devices 18 in communications system 10. A potentially large volume of handover events may be experience in system 10 as satellites 22 pass over population centers. To handle these events efficiently, resource manager 78 may perform or coordinate handover events in prioritized batches.

Figure 5:
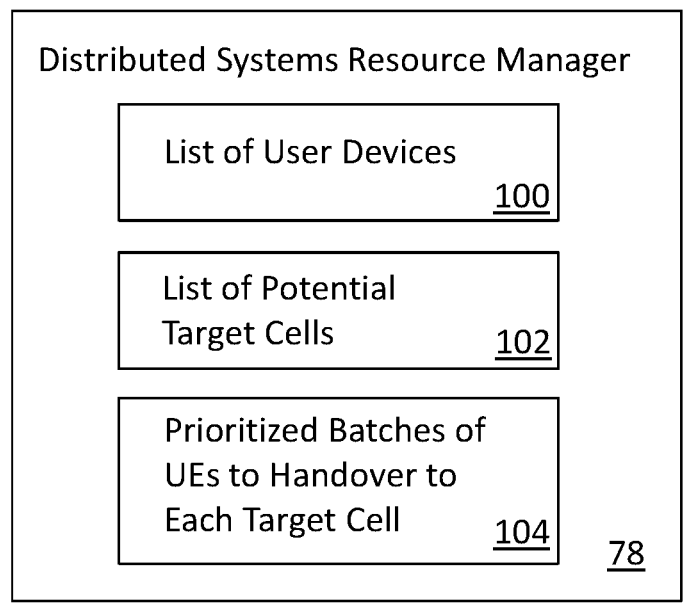
FIG. 5 presents a schematic diagram of an example systems resource manager in a satellite system, in accordance with some embodiments.

To handle handover events in bulk, resource manager 78 may, as an example, maintain information regarding user devices 18, such as list of user devices 100 of FIG. 5. List 100 may include information on the active user communications sessions in system 10. As an example, for each source cell in system 10, list 100 may identify each user device 18 with an active session in that cell. In other implementations, list 100 may reflect a subset of source cells in system 10.

The coverage periods of satellites 22 (e.g., the cells made available by each satellite 22 in different geographic areas at different times) are known to resource manager 78. The geographic location of user devices 18 (and, if desired, additional information, such as any/all of a current link quality, user device direction of movement, speed, the types of wireless surfaces being used by each user device 18, and/or other information on the operational state of system 10) can also be obtained by resource manager 78. Based on this information, resource manager 78 can produce a list of potential target cells (e.g., list 102) to which the user devices in each source cell may be handed over when the satellite links for the user devices in the source cell are no longer satisfactory. The target cells associated with a given source cell may be other cells associated with the same satellite that is handling communications for the source cell or may be cells associated with a different satellite 22, e.g., an incoming satellite. Any suitable handover scheme may be used during handover operation (e.g., a make-before-break scheme, a break-before-make scheme, etc.). If desired, break-before-make procedures may be used for some types of service (e.g., voice calls) and/or some types of devices (e.g., portable devices that do not contain additional transceiver circuitry to support make-before-break handovers), whereas make-before-break procedures may be used for other types of service (e.g., media streaming) and/or other types of devices (e.g., devices that contain multiple transceiver circuits and antennas for handling multiple simultaneous communications links). Handovers can also be prioritized. For example, real-time voice and video services may be prioritized over services such as cloud data synchronization services (as an example). To accommodate relatively large volumes of handover events, handovers can be batched.

As shown in FIG. 5, for example, resource manager 78 may generate prioritized batches of user devices to hand over to each target cell (see, e.g., prioritized batch list 104 of FIG. 5). A prioritized batch can be selected (or formed) based on information such as list 100 of the user devices in a given source cell and list 102 of the potential target cells for each device. Other information also can be considered in selecting a prioritized batch, such as any/all of the type of session/traffic, device capabilities, account, performance metrics, etc. Consider, as an example, a scenario in which 1000 users are near the edge of a satellite's coverage and are soon to transition into a satellite cell associated with an incoming satellite. A first set of these 1000 users (e.g., 300 of the users) may have active communications sessions involving real-time voice and video communications. A second set of these 1000 users (e.g., 350 of the users) may have active communications sessions involving the delivery of streaming movies. A third set of these 1000 users (e.g., 250 of the users) may have active communications sessions involving cloud data synchronization. All of the users are known by resource manager 78 to be transitioning to a target cell associated with the incoming satellite, so resource manager 78 may create, e.g., three batches of users to handover (e.g., batches 104 may contain three lists of users corresponding respectively to the first, second, and third sets of users). To reduce disruption to the users that are most sensitive to service disruption (e.g., the first set of users), the batch of users in the first set may be handed over before the other batches of users. Streaming service users may be more sensitive to service disruptions than synchronization service users, so the batch of users in the second set may be handed over before the third set of users.

By prioritizing handovers by service type in this way, undesired service disruptions can be minimized and, due to the ability to process handovers in large batches, very large volumes of users can be handed over between cells efficiently (e.g., resource manager 78 may efficiently add users sessions to the incoming satellite in favor of the outgoing satellite in this example). During handover operations, resource manager 78 may inform modems 74 in relevant locations of the impending changes in user sessions, may control satellites 22 (e.g., to point a beam former in a satellite to a new batch of users), and/or may coordinate other handover functions for system 10. Make-before-break and break-before-make schemes may be used during handovers, depending on the type of user session involved.

Figure 6:
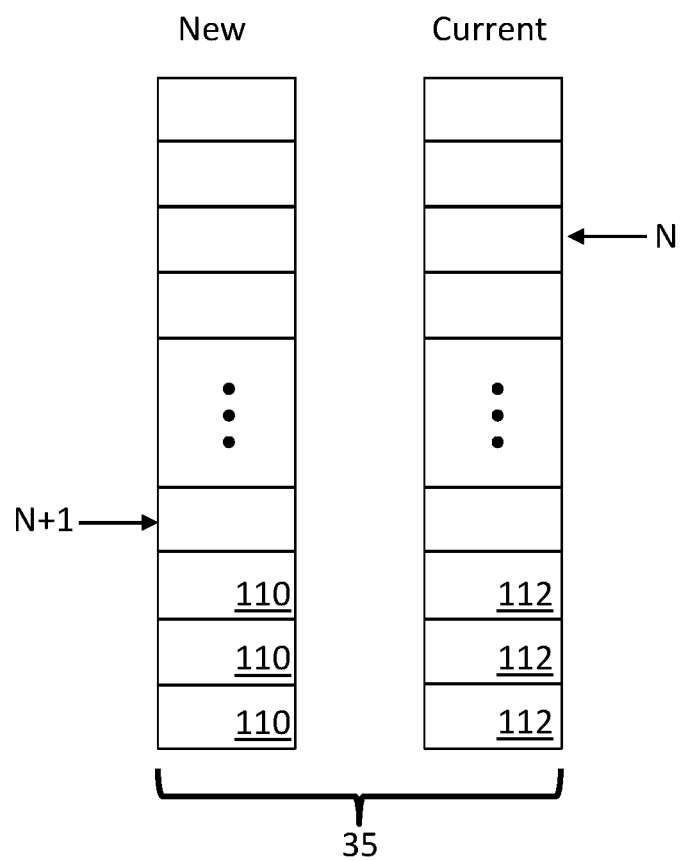
FIG. 6 presents a schematic diagram of illustrative user device buffer circuitry of the type that may be used in a satellite system, in accordance with some embodiments.

FIG. 6 is a schematic diagram of illustrative buffer circuitry 35 of the type that may be used in control circuitry 34 of user device 18 (FIG. 2). As shown in FIG. 6, buffer circuitry 35 may include a first buffer ("current") with data storage locations 112 configured to store received frames or packets of data associated with a current communications session (e.g., a communications session handled by a cell serviced by an outgoing satellite) and may include a second buffer ("new") with storage locations 110 configured to store received frames or packets of data associated with a new communications session (e.g., a communications session handled by a cell serviced by an incoming satellite). Buffer circuitry 35 may also include storage locations for handling transmitted data (initially used in transmitting data to the outgoing satellite and subsequently used in transmitting data to the incoming satellite).

The links 20 that are associated with the outgoing and incoming satellites may have different path delays. The "current" and "new" buffers of FIG. 6 may be circular buffers with sufficient capacity to handle the longest expected path delay difference between satellites. In some situations, the link associated with the outgoing satellite will have a longer path delay than the link associated with the incoming satellite and in other situations, the outgoing link will have a shorter path length delay. In still other situations, the larger path delay may initially be associated with one of the incoming or outgoing satellite, but due to relative position and the time to perform a handover, the larger path delay may switch to become associated with the other satellite, e.g., the outgoing or incoming satellite, respectively. In any event, buffer circuitry 35 can buffer sufficient data to prevent disruptions in received data. If desired, resource manager 78 may take into account path delay differences when initiating a link with an incoming satellite. For example, if an incoming satellite has a shorter path delay than an outgoing satellite, resource manager 78 may establish a link between with user device through the incoming satellite in which data frames or packets being sent to the user device are delayed by an amount that helps accommodate the path delay difference. In other configurations, buffer circuitry 35 is sufficient to accommodate path length delays without imposing transmission timing adjustments.

Figure 7:
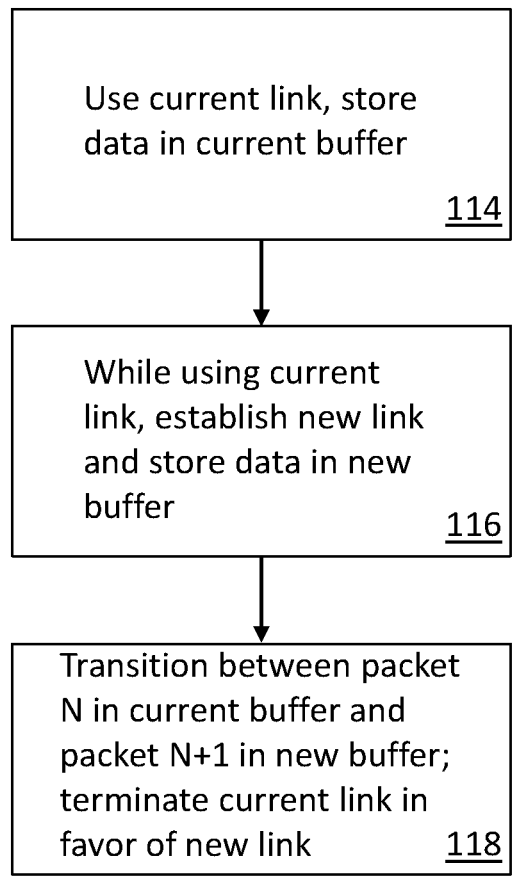
FIG. 7 presents a flow chart of illustrative operations involved in performing a make-before-break handover in a satellite system, in accordance with some embodiments.

FIG. 7 is a flow chart of illustrative operations involved in performing a make-before-break handover in communications system 10. During the operations of block 114, data may be conveyed between a given gateway 14 and a given user device 18 over a link 20 that uses a current satellite cell (e.g., a cell associated with an outgoing satellite). Device 18 may store incoming data frames or packets in a circular buffer such as the "current" buffer of buffer circuitry 35 in FIG. 6.

Based on knowledge of the coverage periods of satellites 22 and/or other information, resource manager 78 may determine that device 18 should be handed over to a new cell (e.g., a cell associated with an incoming satellite). During the operations of block 116, while the existing link between user device 18 and the outgoing satellite is still active, resource manager 78 may establish a new link with user device 18 (e.g., a parallel communications session that passes through the incoming satellite rather than through the outgoing satellite). User device 18 may use multiple receivers 33 (e.g., a first receiver to receive data from the outgoing satellite over a first link and a second receiver 33 to receive data from the incoming satellite over a second link). User device 18 may likewise include first and second transmitters 31 to handle simultaneous transmissions with the outgoing and incoming satellites.

The data received at user device 18 that is associated with the incoming satellite may be stored in the "new" buffer of buffer circuitry 35 in FIG. 6 while, in parallel, the data that is associated with the outgoing satellite is stored in the "current" buffer. Data frames or packets can be labeled in order (e.g., with sequence number or time stamps). This labeling information can be used to ensure a smooth transition between the current and new links.

When sufficient data has been buffered to accommodate a transition between the current and new links, handover operations can be completed (block 118). During the operations of block 118, resource manager 78 may direct gateway 14 and device 18 to terminate the link associated with the outgoing satellite in favor of the link associated with the incoming satellite. Pointers in the current and new circular buffers can be aligned so that device 18 transitions smoothly from retrieving data from the current buffer to retrieving data frames or packets from the new buffer. For example, device 18 can retrieve frame or packet N from the current buffer and can then transition to the new buffer to retrieve frame or packet N+1 and subsequent frames or packets. In this way, disruptions (e.g., lost data) during the handover process can be avoided.

A make-before-break scheme of the type described in connection with FIGS. 6 and 7 may be helpful in scenarios in which a media decoder or other consumer of content in device 18 is sensitive to disruptions in content flow and in which the overhead associate with additional transceiver and buffer circuitry can be accommodated within device 18 (e.g., in a fixed user device configuration and/or in certain mobile device configurations). Satellites 22 in this type of scheme may be, for example, satellites in a constellation of non-geostationary orbit (NGSO) satellites. The use of make-before-brake procedures may help minimize data delivery quality of service (QoS) impacts during handovers of user equipment servicing responsibility from an outgoing satellite (leaving a user equipment coverage area) to an incoming satellite (entering the user equipment coverage area).

With the make-before-break handover, data destined for an individual user device is simultaneously delivered via both the outgoing and incoming satellites. As described in connections with FIGS. 6 and 7, the user device may continue to receive data via the outgoing satellite with a first transceiver circuit (and first antenna or pointed antenna beam) while simultaneously a second transceiver circuit (and second antenna or second pointed antenna beam) is used in receiving duplicate data (e.g., a duplicate data stream) from the incoming satellite. The user device may stitch together the two data streams using buffer circuitry 35, eliminating any duplicate data in buffer circuitry 35 and adjusting for any timing differences between the two transmission paths. The user device may then complete the handover by dropping the connection to the outgoing satellite, e.g., when new data packets/frames are being reliably received and sufficient packets/frames are available to avoid disruption.

Maintaining quality of service using a make-before-break scheme for content such as streaming media content may help ensure user satisfaction for a satellite-based system that distributes streaming media that is viewed in real time. Using the make-before-break approach, system 10 may mitigate against data loss, duplication, or excessive delay variation during handover events. System 10 may enable seamless real-time streaming media delivery across user-device-satellite make-before-break handover events where the user device-satellite path delay differential between the outgoing and incoming satellites may be significantly larger than the duration of a single frame of streaming data. The media data that is streamed in system 10 may include, for example, data compliant with satellite digital broadcasting standards such as the DVB-S2X standard (although any other suitable protocol, format, encoding, etc. can be utilized).

Buffer circuitry 35 may allow uniquely-identified frames or packets of data to be stored and then selected or discarded based on their identifiers (e.g., sequence numbers, time-stamps, etc.). The size for buffer 35 may be selected to be sufficient to accommodate the maximum possible path delay differential between incoming and outgoing satellites. Any additional end-to-end data delivery latency associated with the use of buffer circuitry 35 will be acceptable to users (e.g., because the data being delivered is non-interactive media).

The make-before-break approach used by communications system 10 for media distribution can accommodate large discontinuities in user-device-to-satellite path delay (e.g., for DVB-S2X data) at handover, providing flexibility in both satellite constellation design and handover orchestration.

Communications system 10 may use a gateway with two feeder link antennas (antennas 60 of FIG. 3) to transmit identical data streams to two satellites 22 (e.g., one that is currently serving the user device population but will soon be leaving the service area (the outgoing satellite), and one that is entering the service area (the incoming satellite). Satellites 22 in system 10 may form a constellation of bent-pipe satellites (e.g., low-earth orbit satellites, inclined geosynchronous satellites, etc.) that relay the feeder link signal to the user device (user equipment) population in defined service areas.

User devices 18 may have the capability to simultaneously receive, demodulate and decode signals from both the outgoing and incoming satellites, as described in connection with receivers 33 of FIG. 2. The data signals that are conveyed to each user device 18 may have framing information that enables user device 18 to uniquely identify individual frames or packets of streaming data (e.g. sequence numbers or timestamps).

Buffering with buffer circuitry 35 and processing with control circuitry 34 may enable precise time-alignment of the data streams from the two satellites, as needed to compensate for different path delays from the gateway to the user device, while delivering a constant data rate to a downstream media decoder in device 18 with no frame/packet loss or duplication.

Consider, as an example, an illustrative scenario in which the total path delay through an outgoing satellite is one entire frame duration shorter than the delay through an incoming satellite. When switching between data streams at the end of frame N, in this type of scenario, user device 18 should discard frames N−1 and N that have already been received from the incoming satellite, to avoid data duplication.

Consider, as another example, an illustrative scenario in which a session is being handed to an incoming satellite with a path delay that one frame shorter than the current satellite. When switching between data streams at the end of a frame/packet (e.g., frame/packet M), the user device must retain frames/packets M+1 and M+2 that have been received from the new satellite, appending them to an output buffer in buffer circuitry 35 after frame/packet M (from the current satellite).

In both of these illustrative scenarios, the occupied depth of the buffer changes post-handover based on the path delay differential between the incoming and outgoing satellites.

In some scenarios, it may be desirable to use a break-before-make handover approach. For example, some of devices 18 (e.g., portable devices) may be reduced in cost and weight by omitting additional antennas, additional transceivers, and/or other optional circuitry for handling multiple simultaneous data streams (e.g., the data streams that would be handled simultaneously in a make-before-break approach). By way of another example, some types of service may be amenable to a break-before-make handover process (e.g., such as voice calls where traffic can arrive from different sources in a time separated manner).

To minimize user disruptions during break-before-make handovers, communications system 10 may employ techniques that help minimize transient data loss. As described in connection with FIG. 2, user device 18 may have antennas 30 that form a phased antenna array. The phased antenna array may be adjusted by control circuitry 34 (FIG. 2) to point an antenna beam associated with the phased antenna array. Control circuitry 34 may adjust tunable phase delay components and/or other components in the phased array electronically (e.g., in microseconds), so that the worst-case repointing time for device 18 will approximate the microsecond range (rather than taking seconds for a mechanical pointing arrangement).

Figure 8:
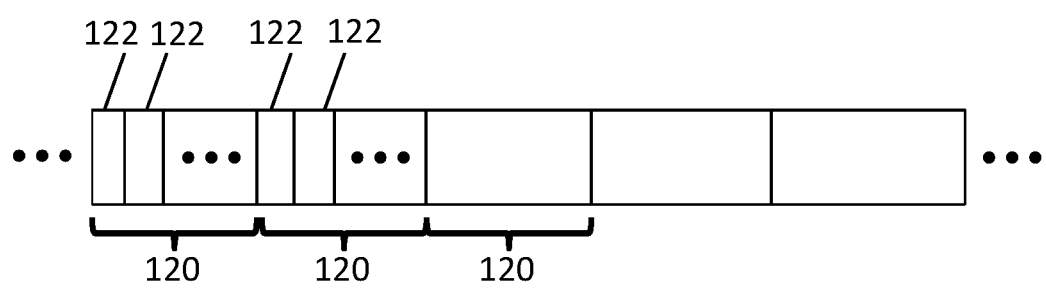
FIG. 8 presents an example time-division-multiplexing framing scheme, in accordance with some embodiments.

To support the break-before-make handover process, communications system 10 may use a time-division multiplexed (TDM) waveform framing structure. As shown in FIG. 8, the framing structure may include multiple fixed-duration frames such as frames 120 and a fixed number of time slots 122 per frame. A transmission burst may be made within each time slot 122 containing encapsulated data that may be addressed to multiple user device destinations.

Consider an example in which satellite 22 produces multiple beams. In this scenario, satellite 22 may produce multiple downlink spot beams, each of which hops to different locations within the satellite's field of view. Beams may hop according to a beam hop schedule that is synchronized with the TDM framing of the signals received by the satellite from the serving gateway 14. Each beam can hop at any TDM slot boundary.

Gateway 14 (or a set of gateways 14) may uplink an independent signal for each of the active downlink spot beams, where the timing of each signal is compensated for the dynamically-changing path delay between the gateway and satellite, such that the TDM framing within the signal (as received at the satellite) aligns with the beam hop schedule.

Resource manager 78 (e.g., a downlink scheduler in resource manager 78) may perform the following operations to implement break-before-make handovers in this environment:

1. Generating the hop schedule for each downlink satellite beam based on awareness of the aggregate traffic demands of the user device population being served by the satellite. The hop schedule may be regenerated and uploaded to the satellite (via a command channel) as often as every TDM frame.

2. Allocating bandwidth to individual user devices 18 within each burst (time slot 122) based on traffic demand and quality of service considerations.

3. Utilizing handover-related timing considerations in generating beam hop schedules and time slot/burst allocations, accounting for: a) the time required by a user device to repoint its antenna at a different satellite and b) the path delay differential between the currently-serving (outgoing) satellite and the incoming satellite System 10 (e.g., resource manager 78) may also perform the following operations:

1. Assigning individual user devices to specific satellites that will provide service, based on considerations such as satellite visibility, link quality, capacity, bandwidth optimization, etc.

2. Transmitting commands to individual user devices or groups (batches) of user devices to initiate a handover operation at a time that is aligned with a time-division multiplexing frame boundary.

3. Initiating commands to the gateway and associated scheduler functions that cause the traffic for individual user devices or groups of user devices to be redirected to the incoming satellite at the specified time-division-multiplexing frame boundary.

User devices 18 may have the following capabilities:

1. An ability to receive burst (discontinuous) transmissions from the satellite that are subject to dynamically-changing path delays.

2. An ability to point a single receive antenna receive beam at a satellite and track its path based on knowledge of the satellite position (satellite ephemeris).

3. An ability to rapidly repoint the antenna beam at the incoming satellite, where the maximum repointing time may be greater than any inter-frame guard-band time allocated.

In some implementations, after the scheduling algorithm of resource manager 78 initiates a handover operation for a particular user device, resource manager 78 prevents scheduling of the transmission burst containing frame N (via the incoming satellite) until the target user device has received the last bit of frame N−1 from the outgoing satellite and has completed repointing its antenna beam at the incoming satellite. In some implementations, the transmission burst containing frame N (via the incoming satellite) can be transmitted before the target user device has received the last bit of frame N−1 and/or completed repointing its antenna at the incoming satellite, as long as the path delay allows for the user device to receive the last bit of frame N−1 and completed repointing its antenna before the transmission burst containing frame N arrives at the user device.

A handover keep-out window may be associated with the delay in the user device readiness to receive after repointing. The duration of the keep-out window may be influenced by the user-device antenna beam repointing time (e.g., one or more frame durations) and may be influenced by differences in path delay from the user device to the outgoing satellite versus the user device and the incoming satellite. If the path delay associated with the incoming satellite is less than the path delay associated with the outgoing satellite, then the target user device would still be receiving the end of frame N from the outgoing satellite at the time of arrival of the first bit of frame N+1, if frame N+1 were scheduled to be transmitted in the succeeding time slot. Resource manager 78 (e.g., the scheduler) may avoid this scenario by delaying the transmission of frame N+1 until a time slot that accommodates the path delay differential at the time of the handover in addition to the beam switching time.

In accordance with an embodiment, a system operable with a satellite constellation that supports satellite communications with user devices is provided that includes a gateway configured to communicate with the satellite constellation, and computing equipment on which a resource manager is implemented, the resource manager is configured to direct the gateway to perform handover operations in prioritized batches of user devices in which user devices in each batch are handed over between an outgoing satellite in the satellite constellation and an incoming satellite in the satellite constellation.

In accordance with another embodiment, the resource manager is further configured to prioritize the batches based on which types of services are being provided to the user devices.

In accordance with another embodiment, the user devices include a first batch of user devices that are receiving real-time voice traffic and include a second batch of user devices that are receiving synchronizing cloud data and the resource manager is configured to prioritize the first batch of users over the second batch of users for the handover operations.

In accordance with another embodiment, the handover operations include make-before-break handover operations.

In accordance with another embodiment, the resource manager is configured to direct the gateway to simultaneously maintain a first communications session with a given one of the user devices that passes through the outgoing satellite and a second communications session with the given one of the user devices that passes through the incoming satellite.

In accordance with another embodiment, the handover operations include break-before-make handover operations and the gateway is configured to use time-division-multiplexing in communicating with the user devices.

In accordance with another embodiment, the gateway is configured to delay transmission of a frame of data to a given one of the user devices through the incoming satellite until a time that accommodates at least a path delay differential between the incoming satellite and the outgoing satellite.

In accordance with another embodiment, the gateway is further configured to delay transmission of the frame of data to the given one of the user devices through the incoming satellite at least partly to accommodate a beam switching time associated with pointing a beam in a phased antenna array in the given one of the user devices.

In accordance with another embodiment, the handover operations include make-before-break handover operations and break-before-make handover operations.

In accordance with another embodiment, the resource manager is configured to perform the handover operations based at least partly on satellite coverage period information.

In accordance with another embodiment, the satellite constellation includes low-earth-orbit satellites, the incoming satellite is an incoming low-earth-orbit satellite, and the outgoing satellite is an outgoing low-earth-orbit satellite.

In accordance with another embodiment, the user devices include mobile user devices and the resource manager is configured to perform the handover operations based at least partly on movements of the mobile user devices.

In accordance with another embodiment, the gateway is configured to transmit streaming media to a first set of the user devices and is configured to transmit real-time voice data to a second set of the user devices.

In accordance with another embodiment, the resource manager is configured to perform the handover operations by handing over the first set of user devices from the outgoing satellite to the incoming satellite using a make-before break handover operations.

In accordance with another embodiment, the resource manager is configured to perform the handover operations by handing over the second set of user devices from the outgoing satellite to the incoming satellite using a break-before-make handover procedure.

In accordance with an embodiment, a system operable with a satellite constellation that supports satellite communications with user devices is provided that includes a gateway configured to communicate with the user devices through the satellite constellation, and computing equipment configured to control the gateway to perform handover operations in which a first group of the user devices are handed over between an outgoing satellite in the satellite constellation and an incoming satellite in the satellite constellation using a break-before-make handover procedure and in which a second group of the user devices are handed over between the outgoing satellite and the incoming satellite using a make-before-break procedure.

In accordance with another embodiment, the computing equipment is configured to control the gateway to perform handover operations in prioritized batches of the user devices.

In accordance with another embodiment, the gateway is configured to provide the first group of user devices with real-time voice traffic during the handover operations and is configured to provide the second group of user devices with streaming media during the handover operations.

In accordance with an embodiment, a system operable with a satellite constellation that supports satellite communications with user devices is provided that includes a gateway configured to communicate with the user devices through the satellite constellation, and computing equipment configured to control the gateway to perform handover operations in which the user devices are handed over between an outgoing satellite in the satellite constellation and an incoming satellite in the satellite constellation in batches and configured to control the gateway to perform at least some of the handover operations using break-before-make handover procedures.

In accordance with another embodiment, the computing equipment is further configured to control the gateway to perform handover operations between the outgoing satellite and the incoming satellite using a make-before-break procedure.

The foregoing is merely illustrative and various modifications can be made to the described embodiments. The foregoing embodiments may be implemented individually or in any combination.

What is claimed is:

1. A system operable with a satellite constellation that supports satellite communications with user devices, comprising:
   a gateway configured to communicate with the satellite constellation; and
   computing equipment on which a resource manager is implemented, wherein the resource manager is configured to direct the gateway to perform handover operations in prioritized batches of user devices in which user devices in each batch are handed over between an outgoing satellite in the satellite constellation and an incoming satellite in the satellite constellation, wherein the user devices include a first batch of user devices that are receiving streaming media traffic and include a second batch of user devices that are receiving synchronizing cloud data traffic that is less latency-sensitive than the streaming media traffic, and wherein the resource manager is configured to prioritize the first batch of user devices over the second batch of user devices for the handover operations.

2. The system defined in claim 1 wherein the resource manager is further configured to prioritize the batches based on which types of services are being provided to the user devices.

3. The system defined in claim 1 wherein the handover operations include make-before-break handover operations.

4. The system defined in claim 3 wherein the resource manager is configured to direct the gateway to simultaneously maintain a first communications session with a given one of the user devices that passes through the outgoing satellite and a second communications session with the given one of the user devices that passes through the incoming satellite.

5. The system defined in claim 1 wherein the handover operations include make-before-break handover operations and break-before-make handover operations.

6. The system defined in claim 5 wherein the resource manager is configured to perform the handover operations based at least partly on satellite coverage period information.

7. The system defined in claim 1 wherein the satellite constellation includes low-earth-orbit satellites, wherein the incoming satellite is an incoming low-earth-orbit satellite, and wherein the outgoing satellite is an outgoing low-earth-orbit satellite.

8. The system defined in claim 1 wherein the user devices include mobile user devices and wherein the resource manager is configured to perform the handover operations based at least partly on movements of the mobile user devices.

9. The system defined in claim 1 wherein the resource manager is configured to perform the handover operations by handing over the user devices in the first batch from the outgoing satellite to the incoming satellite using a make-before break handover procedure.

10. The system defined in claim 1 wherein the resource manager is configured to perform the handover operations by handing over the user devices in the second batch from the outgoing satellite to the incoming satellite using a break-before-make handover procedure.

11. The system defined in claim 1, wherein the user devices include a third batch of user devices that are receiving traffic of a third type that is more latency-sensitive than the traffic of the first type, wherein the resource manager is configured to prioritize the third batch of user devices over the first batch of user devices, and wherein the traffic of the third type comprises real-time voice traffic.

12. A system operable with a satellite constellation that supports satellite communications with user devices, comprising:
    a gateway configured to communicate with the satellite constellation; and
    computing equipment on which a resource manager is implemented, wherein the resource manager is configured to direct the gateway to perform handover operations in prioritized batches of user devices in which user devices in each batch are handed over between an outgoing satellite in the satellite constellation and an incoming satellite in the satellite constellation, wherein the user devices include a first batch of user devices that are receiving real-time voice traffic and include a second batch of user devices that are receiving synchronizing cloud data, and wherein the resource manager is configured to prioritize the first batch of user devices over the second batch of user devices for the handover operations.

13. A system operable with a satellite constellation that supports satellite communications with user devices, comprising:
    a gateway configured to communicate with the satellite constellation; and
    computing equipment on which a resource manager is implemented, wherein the resource manager is configured to direct the gateway to perform handover operations in prioritized batches of user devices in which user devices in each batch are handed over between an outgoing satellite in the satellite constellation and an incoming satellite in the satellite constellation, and wherein the gateway is configured to delay transmission of a frame of data to a given one of the user devices through the incoming satellite until a time that accommodates at least a path delay differential between the incoming satellite and the outgoing satellite.

14. The system defined in claim 13 wherein the gateway is further configured to delay transmission of the frame of data to the given one of the user devices through the incoming satellite at least partly to accommodate a beam switching time associated with pointing a beam in a phased antenna array in the given one of the user devices.

15. The system defined in claim 13 wherein the handover operations include break-before-make handover operations and wherein the gateway is configured to use time-division-multiplexing in communicating with the user devices.

16. A system operable with a satellite constellation that supports satellite communications with user devices, comprising:
  a gateway configured to communicate with the user devices through the satellite constellation; and
  computing equipment configured to control the gateway to perform handover operations in which a first group of the user devices are handed over between an outgoing satellite in the satellite constellation and an incoming satellite in the satellite constellation using a break-before-make handover procedure and in which a second group of the user devices are handed over between the outgoing satellite and the incoming satellite using a make-before-break procedure, wherein the gateway is configured to provide the first group of user devices with real-time voice traffic during the handover operations and is configured to provide the second group of user devices with streaming media during the handover operations.

17. The system defined in claim 16 wherein the computing equipment is configured to control the gateway to perform handover operations in prioritized batches of the user devices.

* * * * *